United States Patent
Zhang

(10) Patent No.: US 9,265,075 B2
(45) Date of Patent: Feb. 16, 2016

(54) DATA CARD AND METHOD FOR QUICKLY ESTABLISHING DIAL-UP CONNECTION THEREOF

(75) Inventor: Hong Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 273 days.

(21) Appl. No.: 13/522,519

(22) PCT Filed: Sep. 17, 2010

(86) PCT No.: PCT/CN2010/077033
§ 371 (c)(1),
(2), (4) Date: Jul. 17, 2012

(87) PCT Pub. No.: WO2011/091667
PCT Pub. Date: Aug. 4, 2011

(65) Prior Publication Data
US 2012/0290728 A1    Nov. 15, 2012

(30) Foreign Application Priority Data
Jan. 29, 2010  (CN) .......................... 2010 1 0106505

(51) Int. Cl.
*G06F 15/16* (2006.01)
*H04W 76/02* (2009.01)
*H04L 29/12* (2006.01)
*H04W 28/18* (2009.01)

(52) U.S. Cl.
CPC ......... *H04W 76/02* (2013.01); *H04L 29/12216* (2013.01); *H04L 29/12311* (2013.01); *H04L 61/2015* (2013.01); *H04W 28/18* (2013.01)

(58) Field of Classification Search
None
See application file for complete search history.

(56) References Cited

U.S. PATENT DOCUMENTS

| 6,483,822 | B1   | 11/2002 | Lioy et al.                    |
|-----------|------|---------|--------------------------------|
| 2002/0099828 | A1* | 7/2002  | Darby .......................... 709/227 |
| 2002/0167905 | A1* | 11/2002 | Wenzel .................... H04L 12/66 370/249 |
| 2003/0105841 | A1* | 6/2003  | Miyake et al. ............... 709/220 |
| 2003/0118010 | A1* | 6/2003  | Ala-Luukko ................ 370/353 |
| 2003/0120818 | A1* | 6/2003  | Ho ................................. 709/250 |
| 2004/0039821 | A1* | 2/2004  | Giglio .............. H04L 29/12216 709/227 |
| 2005/0105529 | A1* | 5/2005  | Arberg et al. ............. 370/395.5 |

(Continued)

FOREIGN PATENT DOCUMENTS

| CN | 1617560 A   | 5/2005  |
| CN | 101572761 A | 11/2009 |

(Continued)

OTHER PUBLICATIONS

SAP, Parallel processing with asynchronous RFC, Mar. 24, 2007, SAP.*

(Continued)

*Primary Examiner* — Ranodhi Serrao
*Assistant Examiner* — James Fiorillo
(74) *Attorney, Agent, or Firm* — Oppedahl Patent Law Firm LLC

(57) ABSTRACT

Method for quickly establishing a dial-up connection by using a data card, which comprises: when a mobile terminal initiates the dial-up connection from a computer, performing both a process of initiating a wireless connection establishment through a Unified Messaging (Um) port and a process of initiating a Dynamic Host Configuration Protocol (DHCP) server through a Remote Messaging (Rm) port at the same time.

10 Claims, 3 Drawing Sheets

(56) References Cited

U.S. PATENT DOCUMENTS

| | | | |
|---|---|---|---|
| 2005/0249238 A1* | 11/2005 | Haumont | 370/466 |
| 2006/0025181 A1* | 2/2006 | Kalofonos et al. | 455/574 |
| 2006/0034213 A1* | 2/2006 | Munje | H04W 28/18 370/328 |
| 2006/0239266 A1* | 10/2006 | Babbar | H04L 29/12311 370/392 |
| 2008/0109539 A1* | 5/2008 | Foster et al. | 709/221 |
| 2008/0281973 A1* | 11/2008 | Yang | 709/228 |
| 2009/0257425 A1 | 10/2009 | Sastry et al. | |
| 2010/0115113 A1* | 5/2010 | Short | H04L 63/08 709/228 |
| 2012/0188908 A1 | 7/2012 | Li | |
| 2014/0115142 A1* | 4/2014 | Peng | H04L 12/413 709/223 |

FOREIGN PATENT DOCUMENTS

| | | | |
|---|---|---|---|
| CN | 101808417 A | | 8/2010 |
| EP | 2469932 A1 | | 6/2012 |
| WO | 0076173 A1 | | 12/2000 |
| WO | 2006116190 A2 | | 11/2006 |

OTHER PUBLICATIONS

Wei, G., Fujii, A., Nemoto, Y., A timer-based data link control protocol for mobile computing, Oct. 1998, vol. 2, 1339-1343.*

International Search Report in international application number: PCT/CN2010/077033, mailed on Dec. 30, 2010.

English Translation of the Written Opinion of the International Search Authority in international application No. PCT/CN2010/077033, mailed on Dec. 30, 2010.

Station-based-fast-handoff-solution-for-IEEE-802.11b/g-wireless-LANs Jun. 30, 2008.

Fast-handoff-algorithm-for-WLAN-based-on-dynamic-cache Jan. 31, 2009.

Supplementary European Search Report in European application No. 10844444.9, mailed on Nov. 3, 2014. (10 pages).

* cited by examiner

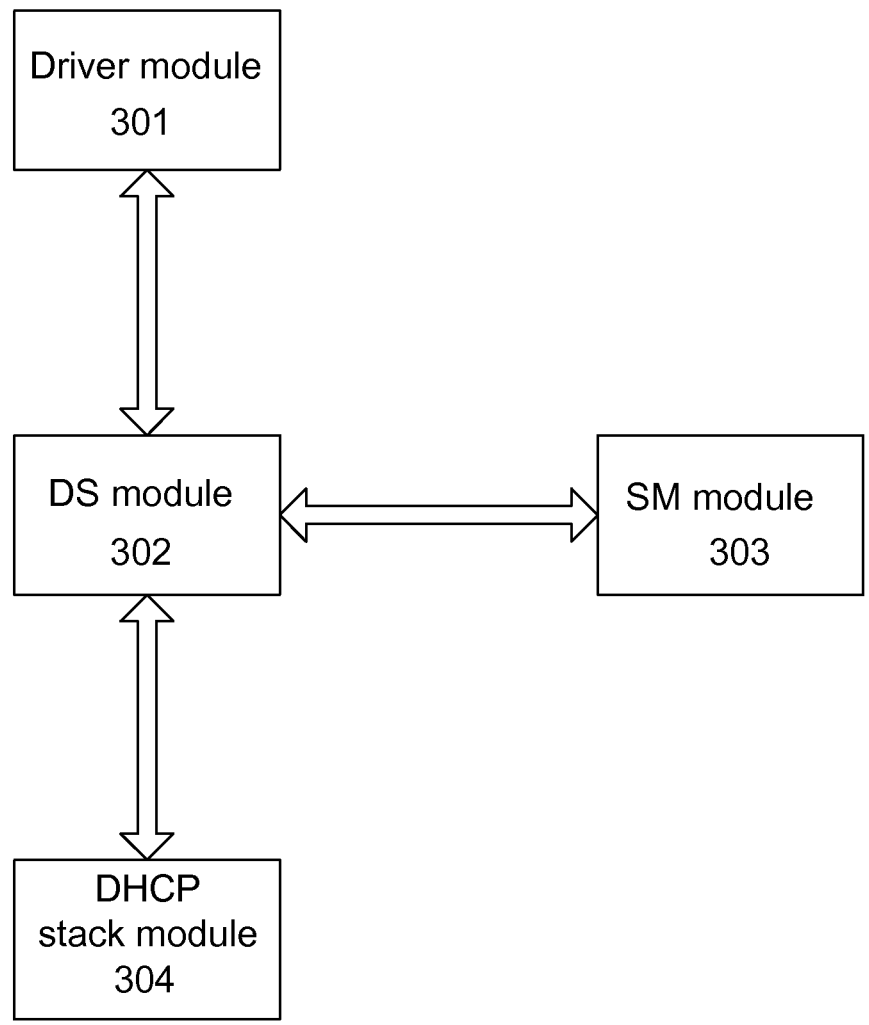

DATA CARD AND METHOD FOR QUICKLY ESTABLISHING DIAL-UP CONNECTION THEREOF

TECHNICAL FIELD

The disclosure relates to the field of wireless communications, particularly to a data card and a method for quickly establishing a dial-up connection by using a data card.

BACKGROUND

As the coming of the 3G mobile communication era, with respect to fixed network access, the wireless data card attracts huge demand of users on wireless Internet access due to its high-speed and mobility, and dial-up time delay for Internet dial-up access of a wireless data card also becomes an important user experience index.

TE+MT application mode is employed in the data card to realize dial-up Internet access, Terminal Equipment (TE) is generally a PC or laptop, Mobile Terminal (MT) is a wireless data card or mobile phone terminal. The interface between TE and MT is called Rm interface, and the interface between MT and wireless network is called Um interface. The dial-up Internet access process of the data card comprises of two processes: Rm interface connection establishment and Um interface connection establishment.

In the $3^{rd}$ Generation Partnership Project (3GPP) protocol, two bearing ways are defined for the upper application data of the data card, namely, IP and PPP. In practical application, the data card usually employs IP bearing way to perform data transmission. The following two dial-up ways described in the disclosure are both based on IP bearing way.

Point-to-point (PPP) data link protocol or Dynamic Host Configuration Protocol (DHCP) data protocol may be employed for Rm interface connection establishment. Due to different connection establishment protocols employed by the Rm interface, the dial-up of the data card may be divided into two ways: RAS dial-up and NDIS dial-up. For NDIS dial-up, the Rm interface employs DHCP to establish the data connection; and for RAS dial-up, the Rm interface employs PPP to establish the data connection.

Um interface connection establishment comprises wireless bearing establishment and PDP activation processes. For RAS and NDIS, the processing flow of the Um interface is the same.

As shown in FIG. 1, the dial-up connection establishment flow diagram of the NDIS dial-up comprises of the following steps:

Step S101: A user initiates a dial-up: TE sends a QMI dial-up message to MT;

Step S102: MT receives the dial-up message: MT initiates a dial-up connection process;

Step S103: Um port of MT establishes a wireless connection with the access network: MT sends information requesting for activation of the Packet Data Protocol context (PDP Context) to a Servicing GPRS Support Node (SGSN), SGSN authenticates the CHAP or PAP authentication information from TE, after authentication is successful, it allocates a dynamic IP address, a DNS address and a NBNS address for the user. These parameters are sent to MT through reception information activating the PDP context. The largest duration for PDP activation is specified as 40 s in the 3GPP protocol.

Step S104: The Rm port finishes DHCP negotiation: MT receives the PDP activation message, the status of the Um interface becomes UP, then the DHCP server is initiated, and the activation status of PDP is notified to TE, finally TE sends a DHCP discover message; after MT receives the DHCP discover message from TE, TE and MT start the DHCP negotiation process, MT sends information such as IP address and DNS address allocated by the GGSN to TE according to specifications of the DHCP protocol.

Step S105: The Rm interface finishes the ARP negotiation: TE initiates the ARP process, and MT and TE finish the ARP negotiation;

Step S106: The dial-up connection is established, and the dial-up process is ended.

It can be seen from above flows that, in step S104, MT side has to wait TE to establish DHCP service and sends DHCP discover, if TE side is based on the WINDOWS operating system, the time for establishing DHCP service generally needs about 3 s, the whole process is complicated and takes relatively long time, the user experience is poor.

SUMMARY

The purpose of the disclosure is to provide a data card and a method for quickly establishing a dial-up connection, so as to shorten dial-up time and realize quick dial-up.

In order to achieve the purpose, the technical solution of the disclosure is realized as follows.

A method for quickly establishing a dial-up connection by using a data card is provided, which comprises: when a mobile terminal initiates the dial-up connection from a computer, performing both a process of initiating a wireless connection establishment through a Unified Messaging (Um) port and a process of initiating a Dynamic Host Configuration Protocol (DHCP) server through a Remote Messaging (Rm) port at the same time.

The process of initiating the wireless connection establishment through the Um port may comprise: initiating, by the mobile terminal, the connection establishment between the Um port and a wireless network after receiving a dial-up connection message from the computer; and the method may further comprise: before the process of initiating the wireless connection establishment through the Um port, initiating, through the Um port of the mobile terminal, cell attachment, authentication and PDP activation processes sequentially.

The method may further comprise: after the process of initiating the wireless connection establishment through the Um port and the process of initiating the DHCP server through the Rm port are started, starting a DHCP timer for performing time-out detection, wherein the DHCP timer is notified of a wireless connection establishment event after the process of the wireless connection establishment ends.

The method may further comprise: detecting, by the DHCP timer, the wireless connection establishment event; in the case that the wireless connection establishment event is a wireless connection establishment success event, when the timer is not yet timed out, continuing to wait, by the DHCP, until discovering a DHCP discover message, and then responding a DHCP offer message and completing the DHCP process; or when the DHCP timer is timed out, determining the connection establishment as being failed; in the case that the wireless connection establishment event is a wireless connection establishment failure event, ending the DHCP process, deleting the DHCP timer, and no longer responding the DHCP discover message from a Terminal Equipment (TE), determining the connection establishment as being failed, since the TE which fails to receive a response to the DHCP discover message.

The method may further comprise: when the DHCP timer detects the DHCP discover message and the timer is not yet timed out, in the case that no wireless connection establishment event has been detected, not responding the DHCP discover message, resending, by the TE, the DHCP discover message after a response to the message is timed out, wherein the steps are repeated until the wireless connection establishment event is received.

The method may further comprise: when the DHCP timer is timed out, in the case that no message is detected, restarting the DHCP timer, wherein the step is repeated until the wireless connection establishment event or the DHCP discover message is received.

The method may further comprise: when the wireless connection establishment is unsuccessful, deleting the DHCP timer and ending the DHCP process.

The method may further comprise: when the DHCP discover message is detected, deleting the DHCP timer, and beginning to perform Address Resolution Protocol (ARP) negotiation through the Rm port.

A data card for quickly establishing a dial-up connection, comprises a driver module, a Data service (DS) module, a Session manager (SM) module and a Dynamic Host Configuration Protocol (DHCP) stack module, wherein the driver module is a communication module that performs data exchange between the data card and a Personal Computer (PC), a dial-up message are sent to the data card from the PC through the driver module; the DS module is a module through which the data card processes dial-up-related data messages, the DS module, after receiving the dial-up message, analyzes and sends the dial-up message to the SM module and the DHCP stack module for processing, respectively; the SM module is a processing module that performs data interaction between the data card and a network.

The data card may further comprise a Unified Messaging (Um) port and a Remote Messaging (Rm) port, after the data card receives the dial-up message, the DS module initiates a process of wireless connection establishment through the Um port, and initiates a DHCP server through the Rm port.

In conclusion, when compared with the prior art, in the technical solution of the disclosure, the time for initiating the DHCP server by the TE is advanced and is identical to the time for initiating the wireless transmission connection establishment, thus the Um side and the Rm side can initiate the dial-up flow at the same time, and the time for waiting DHCP discover messages and the time for waiting the wireless connection establishment overlap, in this way, the purpose of shortening dial-up time and realizing quick dial-up.

BRIEF DESCRIPTION OF THE DRAWINGS

FIG. 3 shows a diagram of a data card in an embodiment of the disclosure.

DETAILED DESCRIPTION

Figure 1:
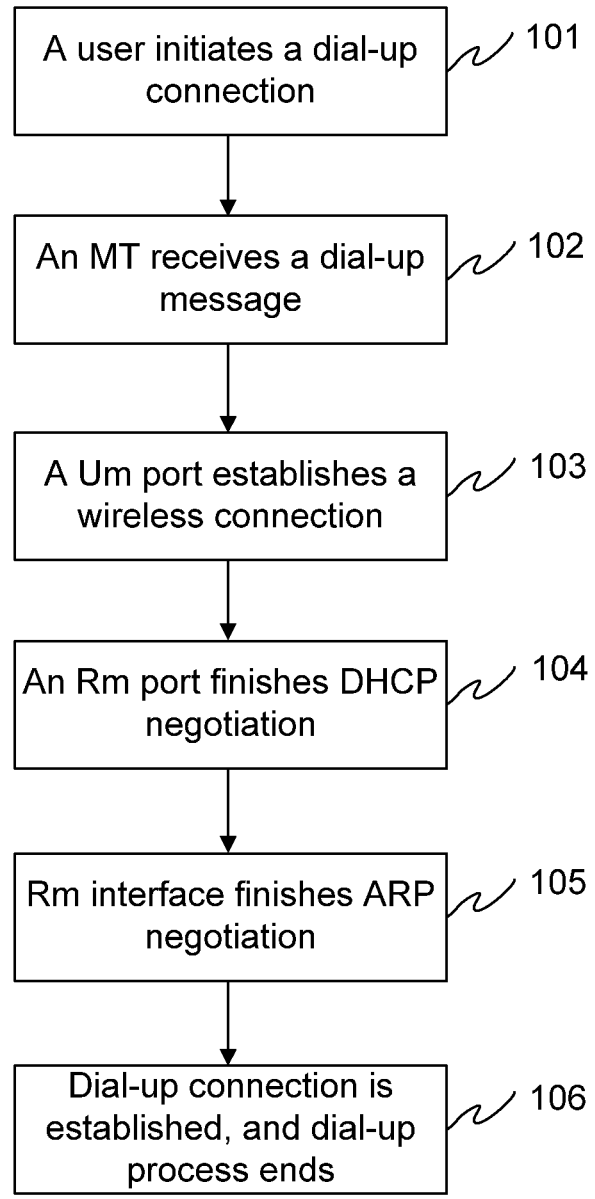
FIG. 1 shows a flowchart of NDIS dial-up by an existing mobile communication terminal.

Based on analysis of a dial-up flow and test data under a test network, the disclosure provides a method for shortening NDIS dial-up connection duration; the technical solution of the disclosure is based on terminal equipment.

TABLE 1

| No. | Processes | Duration (ms) |
|---|---|---|
| 1 | Process of interface connection establishment | 3440 |
| 2 | Process of waiting TE to establish DHCP service | 3830 |
| 3 | Process of DHCP negotiation between MT and TE | 3830 |
| 4 | ARP protocol establishment of TE | 1325 |

In Table 1, NDIS dial-up is divided into multiple sub-flows, data obtained by testing a dial-up connection for 20 times in the test network is listed. As shown in Table 1, the NDIS dial-up flow is divided into sub-processes in the following order; column shows the time consumed or each sub-flow of the NDIS dial-up. Wherein, sub-processes 1, 2 and 3 belong to interaction processes between an MT and a wireless network, sub-process 4 belongs to an interaction process between a TE and the MT. All sub-processes are explained as follows, respectively.

1. Process of Interface Connection Establishment

It indicates time for process of Um interface wireless connection establishment, including wireless bearing establishment, PDP activation, Um interface protocol UP identifier Um interface wireless connection establishment between the MT and the wireless access network.

2. Process of Waiting TE to Establish DHCP Service

It indicates time for Rm interface connection establishment, including initiating a DHCP server, notifying the TE to initiate the DHCP negotiation, and executing the next process after receiving the DHCP discover message identifier from the TE.

3. Process of DHCP Negotiation Between MT and TE

It means consumed time for process of the DHCP negotiation between the MT and the TE.

4. ARP Protocol Establishment of TE

It indicates time for TE to finish an ARP process.

In Table 1, during NDIS dial-up, after initiating the DHCP server, the time for the process that the MT waits the TE to initiate the DHCP discover message is 3830 ms. In the technical solution of the disclosure, the time for initiating the DHCP server by the TE is advanced and is identical to the time for initiating the wireless transmission connection establishment, so a Um side and an Rm side can initiate the dial-up flow, and the time for waiting DHCP discover messages and the time for waiting the wireless connection establishment overlap, in this way, the purpose of shortening dial-up time and realizing quick dial-up is achieved. Corresponding to the dial-up processes listed in Table 1, process 2 is advanced to be synchronous with process 1. After the DHCP server is initiated, the Rm needs to detect the DHCP discover message from the TE and interface UP message from Um synchronously, after both messages are received, the DHCP negotiation process with the TE can be initiated, to further finish the dial-up process. It can be seen from the time data obtained by testing in the test network in Table 1 that, through the method, the dial-up time can be effectively shortened by about 3 s, which is ⅓ of the total dial-up Internet access duration.

As the largest establishment time for a wireless connection at the Um side is about 40 s (this is mainly because that PDP connection establishment is time-consuming), while the DHCP waiting time at the Rm side is also fixed (less than 40 s), so at the worst, the dial-up connection failure message can be obtained after about 40 s, this time is 3 s less than the time needed in the currently realized worst case. When compared with similar products, the disclosure has obvious advantage.

The technical solution disclosed in the disclosure will be described in details below with reference to drawings and specific embodiments.

Figure 2:
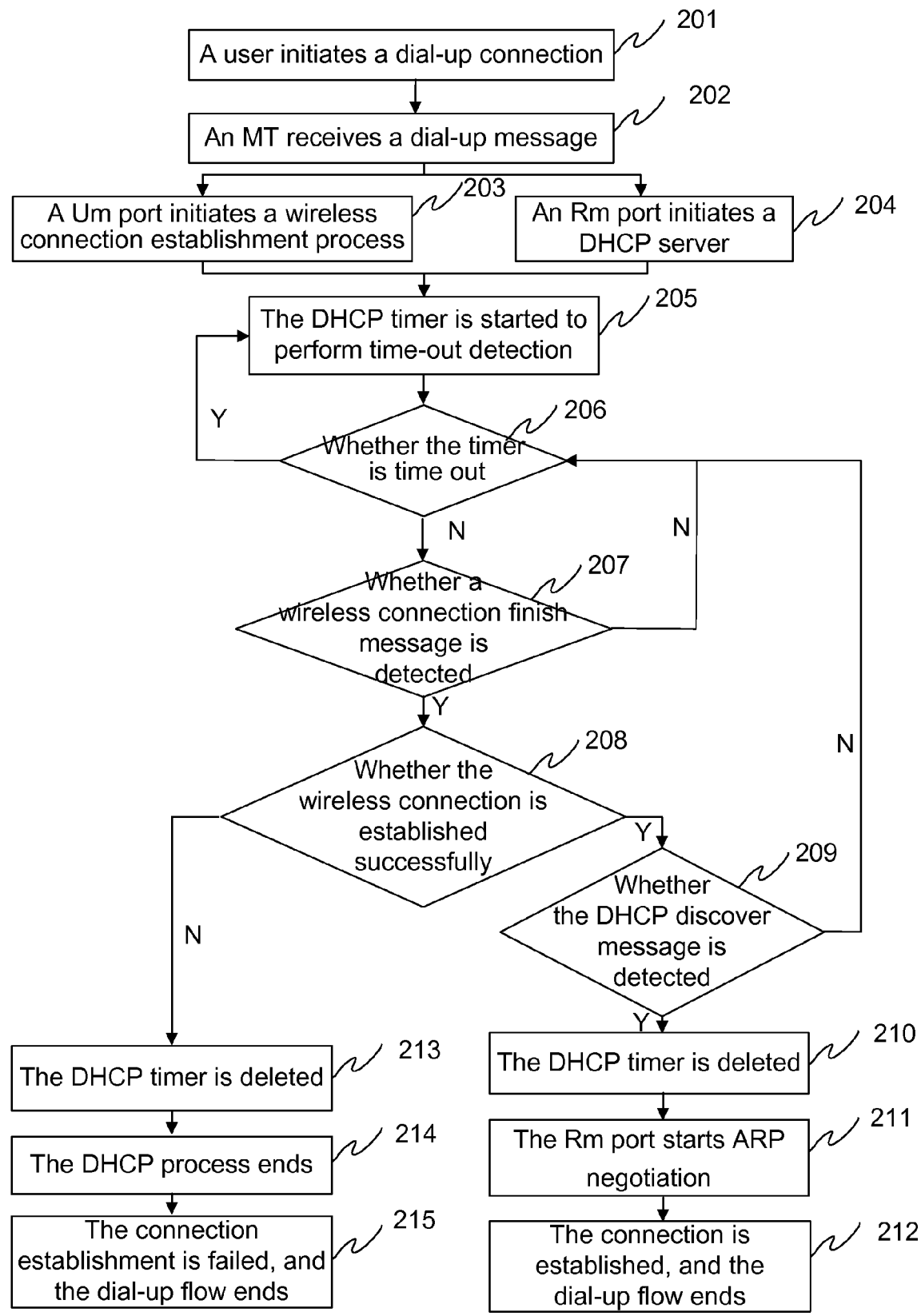
FIG. 2 shows a flowchart of a method for quickly establishing a dial-up connection by a mobile communication terminal in an embodiment of the disclosure.

FIG. 2 shows a flowchart of a method for quickly establishing a dial-up connection by using a data card, which comprises the following steps.

Step S201: A user TE initiates a dial-up connection;
Step S202: An MT receives a dial-up message;
Step S203: A Um port initiates a wireless connection establishment process;

After receiving a dial-up connection message from the TE, the MT initiates the process of connection establishment between the Um port and a wireless network; the Um port of the MT initiates processes such as cell attachment, authentication, PDP activation and wireless connection establishment sequentially. After the process of wireless connection establishment ends, a DHCP timer is notified of a wireless connection establishment event, the wireless connection establishment event comprises a wireless connection establishment success event and a wireless connection establishment failure event.

Step S204: An Rm port initiates a DHCP server;
Step S205: The DHCP timer is started to perform time-out detection;

The DHCP timer of the Rm port detects the following events:

The DHCP timer detects the wireless connection establishment event and the timer is not yet timed out. In the case that the wireless connection establishment event is the wireless connection establishment success event, a DHCP discover message is waited, a DHCP offer message is responded and the DHCP process is finished, or when the DHCP timer is timed out, and the connection establishment is determined as being failed; in the case that the wireless connection establishment event is the wireless connection establishment failure event, the DHCP server is further deleted, the DHCP timer is deleted, the DHCP discover message from the TE side is no longer responded, the connection establishment is determined as being failed if the DHCP discover message from the TE side is always not responded.

The DHCP timer detects the DHCP discover message and the timer is not yet timed out. In the case that no wireless connection establishment event has been detected, the DHCP discover message is not responded, the TE resends the DHCP discover message after a response to the message is timed out; wherein the steps are repeated until the wireless connection establishment event is received, at this time, the last flow is executed.

The timer is time out, in the case that no message is detected, the DHCP timer is reinitiated, wherein the step is repeated until the wireless connection establishment event or the DHCP discover message is received, at this time last two flows are executed.

Step S206: It is judged whether the timer is time out; if yes, step S205 is executed; otherwise, step S207 is executed;
Step S207: It is judged whether a wireless connection finish message is detected; if yes, step S208 is executed; otherwise, step S206 is executed;
Step S208: It is judged whether the wireless connection is established successfully; if yes, step S209 is executed; otherwise, step S213 is executed;
Step S209: It is judged whether the DHCP discover message is detected; if yes, step S210 is executed; otherwise, step S206 is executed;
Step S210: The DHCP timer is deleted;
Step S211: The Rm port starts ARP negotiation;
Step S212: The connection is established, and the dial-up flow ends;
Step S213: The DHCP timer is deleted;
Step S214: The DHCP process ends;
Step S215: The connection establishment is failed, and the dial-up flow ends.

FIG. 3 shows a diagram of main software modules involved with a data card in an embodiment of the disclosure. The method proposed in the disclosure is not involved to TE side software modules. The data card comprises a driver module 301, a Data service (DS) module 302, a Session manager (SM) module 303 and a DHCP stack module 304.

The driver module 301 is a communication module that performs data exchange between the data card and a PC, a dial-up message are sent to the data card from the PC through the driver module, step S201 relates to the process of the driver module 301. The DS module 302 is a module through which the data card processes dial-up-related data messages, after receiving the dial-up message, the DS module 302 analyzes and sends the dial-up message to the SM module 303 and the DHCP stack module 304 for processing, respectively. The SM module 303 is a processing module that performs data interaction between the data card and a network. The DHCP stack module 304 processes flows related to the DHCP protocol. Step S203 relates to the process of the SM module 303 and the DHCP stack module 304. Steps S203-S209 are finished by the DHCP stack module 304. Steps S210-S215 are processed by a PC software module.

Of course, the disclosure may also have many implementation ways, for technicians in the field, the disclosure may have various corresponding modifications or changes within the spirit and principle of the disclosure, any modifications, equivalent replacements and improvements within the spirit and principle of the disclosure should be included within the protection scope of the disclosure.

What is claimed is:

1. A method for quickly establishing a dial-up connection by using a data card, comprising:
   initiating, by a mobile terminal, a dial-up connection from a computer;
   performing both a process of initiating a wireless connection establishment through a Unified Messaging (Um) port and a process of initiating a Dynamic Host Configuration Protocol (DHCP) server through a Remote Messaging (Rm) port at the same time;
   wherein after the DHCP server is initiated, detecting synchronously, a DHCP discovery message from the computer through the Rm port, and an UP message through the Um port;
   wherein after the DHCP discovery message and the UP message are received, initiating a DHCP negotiation process between the computer and the mobile terminal to finish the dial-up connection;
   wherein after the process of initiating the wireless connection establishment through the Um port and the process of initiating the DHCP server through the Rm port are started, starting a DHCP timer for performing time-out detection, wherein the DHCP timer is notified of a wireless connection establishment event after the process of the wireless connection establishment ends;
   and performing the DHCP process according to the wireless connection establishment event wherein:
   in the case that the wireless connection establishment event is a wireless connection establishment success event, and when the DHCP timer is not yet timed out, continuing to wait, by the DHCP timer, until discovering a DHCP discover message, and then responding with a DHCP offer message and completing the DHCP process;

or when the DHCP timer is timed out, determining the connection establishment as being failed;

in the case that the wireless connection establishment event is a wireless connection establishment failure event, deleting the DHCP timer and ending the DHCP process.

2. The method according to claim 1 further comprising: when the DHCP timer detects the DHCP discover message and the timer is not yet timed out, in the case that no wireless connection establishment event has been detected, not responding the DHCP discover message, resending, by the computer, the DHCP discover message after a response to the message is timed out, wherein the steps are repeated until the wireless connection establishment event is received.

3. The method according to claim 2, further comprising: when the DHCP timer is timed out, in the case that no message is detected, restarting the DHCP timer.

4. The method according to claim 2, further comprising: when the wireless connection establishment is unsuccessful, deleting the DHCP timer and ending the DHCP process.

5. The method according to claim 2, further comprising: when the DHCP discover message is detected, deleting the DHCP timer, and beginning to perform Address Resolution Protocol (ARP) negotiation through the Rm port.

6. The method according to claim 1, wherein the process of initiating the wireless connection establishment through the Um port comprises: initiating, by the mobile terminal, the connection establishment between the Um port and a wireless network after receiving a dial-up connection message from the computer; and the method further comprises: before the process of initiating the wireless connection establishment through the Um port, initiating, through the Um port of the mobile terminal, cell attachment, authentication and PDP activation processes sequentially.

7. The method according to claim 1, further comprising: when the DHCP timer is timed out, in the case that no message is detected, restarting the DHCP timer, wherein the step is repeated until the wireless connection establishment event or the DHCP discover message is received.

8. The method according to claim 1 further comprising when the DHCP discover message is detected, deleting the DHCP timer, and beginning to perform Address Resolution Protocol (ARP) negotiation through the Rm port.

9. The method according to claim 1, further comprising: when the DHCP timer is timed out, in the case that no message is detected, restarting the DHCP timer, wherein the step is repeated until the wireless connection establishment event or the DHCP discover message is received.

10. A system for quickly establishing a dial-up connection comprising;
a data card;
a personal computer (PC);
wherein the data card is encoded with software comprising executable instructions operable to: enable operations for a driver module, a Data service (DS) module, a Session manager (SM) module and a Dynamic Host Configuration Protocol (DHCP) stack module, wherein the driver module is a communication module that performs data exchange between the data card and the Personal Computer (PC), wherein a dial-up message is sent to the data card from the PC through the driver module;

the DS module is a module through which the data card processes dial-up-related data messages, the DS module, after receiving the dial-up message, analyzes and sends the dial-up message to the SM module and the DHCP stack module for processing, respectively;

the SM module is a processing module that performs data interaction between the data card and a network, wherein the data card further comprises a Unified Messaging (Um) port and a Remote Messaging (Rm) port, after the data card receives the dial-up message, the DS module initiates a process of wireless connection establishment through the Um port, and initiates a DHCP server through the Rm port at the same time;

wherein after the DHCP server is initiated, detecting synchronously, a DHCP discovery message from the computer through the Rm port, and an UP message through the Um port;

wherein after the DHCP discovery message and the UP message are received, initiating a DHCP negotiation process between the computer and the mobile terminal to finish the dial-up connection;

wherein after the process of initiating the wireless connection establishment through the Um port and the process of initiating the DHCP server through the Rm port are started, starting a DHCP timer for performing time-out detection, wherein the DHCP timer is notified of a wireless connection establishment event after the process of the wireless connection establishment ends;

and performing the DHCP process according to the wireless connection establishment event wherein:

in the case that the wireless connection establishment event is a wireless connection establishment success event, and when the DHCP timer is not yet timed out, continuing to wait, by the DHCP timer, until discovering a DHCP discover message, and then responding with a DHCP offer message and completing the DHCP process;

or when the DHCP timer is timed out, determining the connection establishment as being failed;

in the case that the wireless connection establishment event is a wireless connection establishment failure event, deleting the DHCP timer and ending the DHCP process.

* * * * *